(12) United States Patent
Elhelo et al.

(10) Patent No.: US 12,483,575 B2
(45) Date of Patent: Nov. 25, 2025

(54) NETWORK DEVICE CLASSIFICATION

(71) Applicant: CHECK POINT SOFTWARE TECHNOLOGIES LTD., Tel Aviv (IL)

(72) Inventors: Amit Elhelo, Tel Aviv (IL); Dmitry Zinkevich, Ashdod (IL); Erez Israel, Tel Aviv (IL); Daniel Cohen-Sason, Rishon Le-Zion (IL); Ofek Dadush, Givat Shmuel (IL); Natan Katz, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 395 days.

(21) Appl. No.: 18/345,214

(22) Filed: Jun. 30, 2023

(65) Prior Publication Data

US 2025/0007934 A1  Jan. 2, 2025

(51) Int. Cl.
*H04L 29/00* (2006.01)
*H04L 9/40* (2022.01)

(52) U.S. Cl.
CPC .......... *H04L 63/1425* (2013.01); *H04L 63/20* (2013.01)

(58) Field of Classification Search
CPC .............................. H04L 63/1425; H04L 63/20
See application file for complete search history.

(56) References Cited

U.S. PATENT DOCUMENTS

2022/0070195 A1\* 3/2022 Sern ...................... G06F 21/552

FOREIGN PATENT DOCUMENTS

| CN | 116825234 A | \* | 9/2023 |
| CN | 120298738 A | \* | 7/2025 |

\* cited by examiner

*Primary Examiner* — Brandon Hoffman
*Assistant Examiner* — Helai Salehi
(74) *Attorney, Agent, or Firm* — Renner, Otto, Boisselle & Sklar, LLP

(57) ABSTRACT

A device and method for classifying network devices based on their manufacturer (also referred to as vendor or brand) and function (e.g., printer, car, thermostat, etc.). This classification process utilizes a trained model that leverages parameters associated with the device's network activity as input.

20 Claims, 4 Drawing Sheets

NETWORK DEVICE CLASSIFICATION

TECHNICAL FIELD

The present disclosure relates generally to network devices and more particularly to network device classification.

BACKGROUND

IoT (Internet of Things) devices have become increasingly pervasive, leading to an increase in network traffic. However, organizations operating these networks often face challenges in effectively detecting the sources and functionality of these devices. The inability to identify the origins and purposes of IoT devices hampers the organizations' ability to define and enforce appropriate rules and policies. This is particularly crucial because a number of these devices might be infested with bots with malicious intentions, posing a threat to network security.

Existing solutions for detecting these devices rely on utilizing MAC addresses and static information about users. By leveraging this data, organizations attempt to establish rules and policies to govern the behavior of IoT devices on their networks. However, this rule-based approach suffers from limitations and fails to cover all possible scenarios. As with any rule-based system, it is challenging to account for the diverse and evolving nature of IoT devices and their traffic patterns solely based on static information and MAC addresses.

Moreover, existing solutions in the field of IoT device detection often require domain expertise, tend to be deterministic in nature, produce results with low confidence, and typically rely solely on MAC address information. These shortcomings hinder the efficacy and accuracy of IoT device detection and hinder the ability to proactively identify and mitigate potential security risks associated with these devices.

SUMMARY

There is a need for a more holistic and sophisticated approach to detect and understand IoT device traffic, enabling organizations to establish more effective and adaptive enforcement rules. Machine learning (ML) presents a promising solution to address these challenges. By leveraging ML algorithms and techniques, it becomes possible to analyze and interpret the vast amount of data generated by IoT devices, enabling the development of more robust and accurate models for detecting and classifying these devices.

A more comprehensive and ML-based approach to IoT device detection would not only enhance the ability to identify the sources and functionalities of these devices but also enable organizations to identify patterns, anomalies, and potential threats in real-time. By employing ML, it becomes feasible to overcome the limitations of traditional rule-based systems and achieve a higher level of accuracy, confidence, and adaptability in IoT device detection.

The present disclosure provides a novel method for effectively classifying IoT and other devices based on their manufacturer (also referred to as vendor or brand) and function (e.g., printer, car, thermostat, etc.). This classification process utilizes a trained model that leverages parameters associated with the device's network activity as input. By analyzing the device's network behavior, the model identifies the manufacture and function of the device, facilitating various applications in network management and security.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
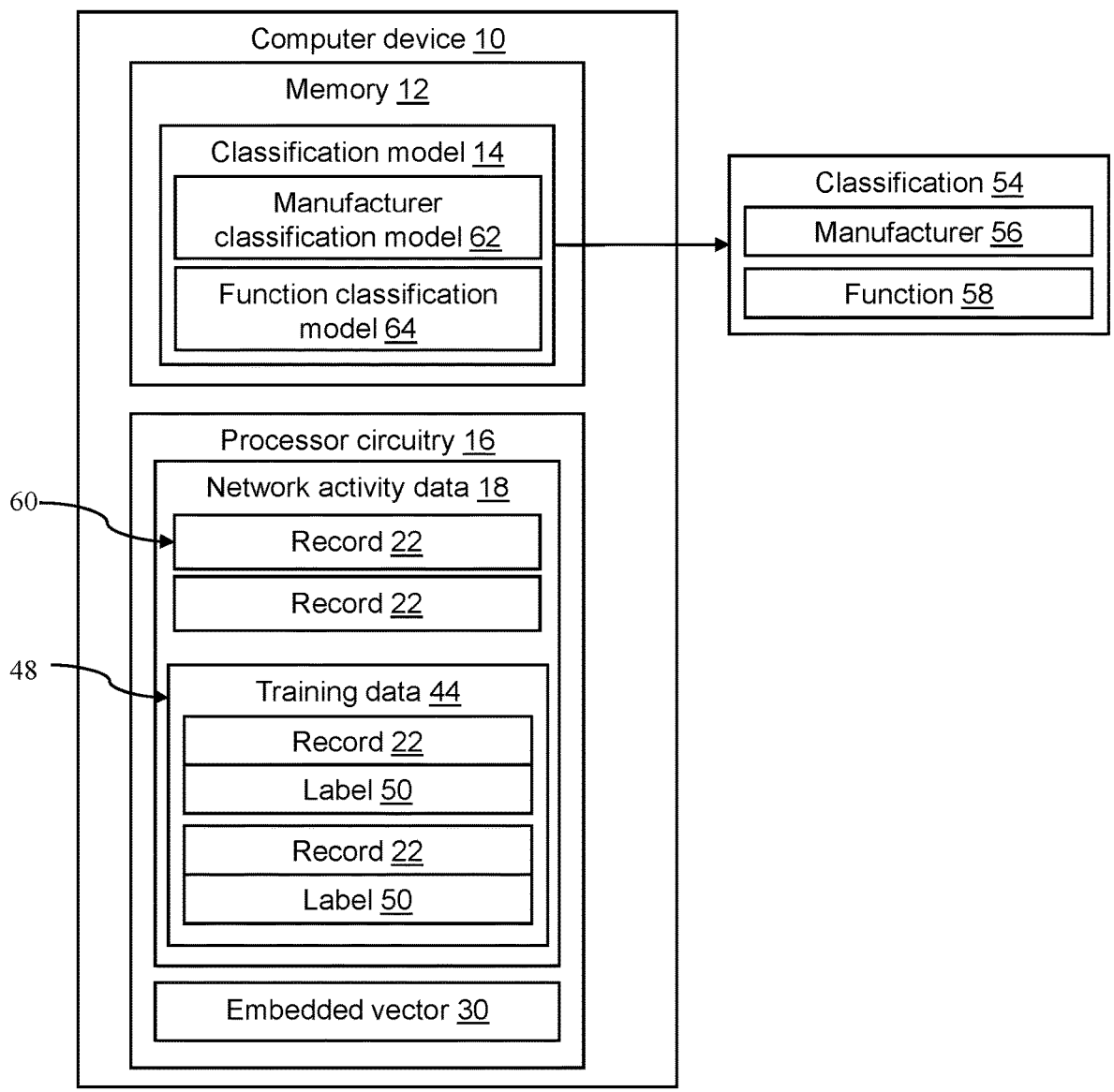
FIG. 1 is an exemplary diagram of a computer device for training and applying a classification model to classify network devices.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

Embodiments of the present disclosure relate to a device and method for training and applying a classification model to classify network devices based on their manufacturer and function using network activity data.

By classifying network devices (e.g., IoT devices), including identifying their vendor and function, an organization may better enforce network security policies. For example, classification may be used to restrict a device's network access to only a set of servers needed for it to function properly and may be used to identify unknown rogue or misbehaving devices in an enterprise network.

Figure 2:
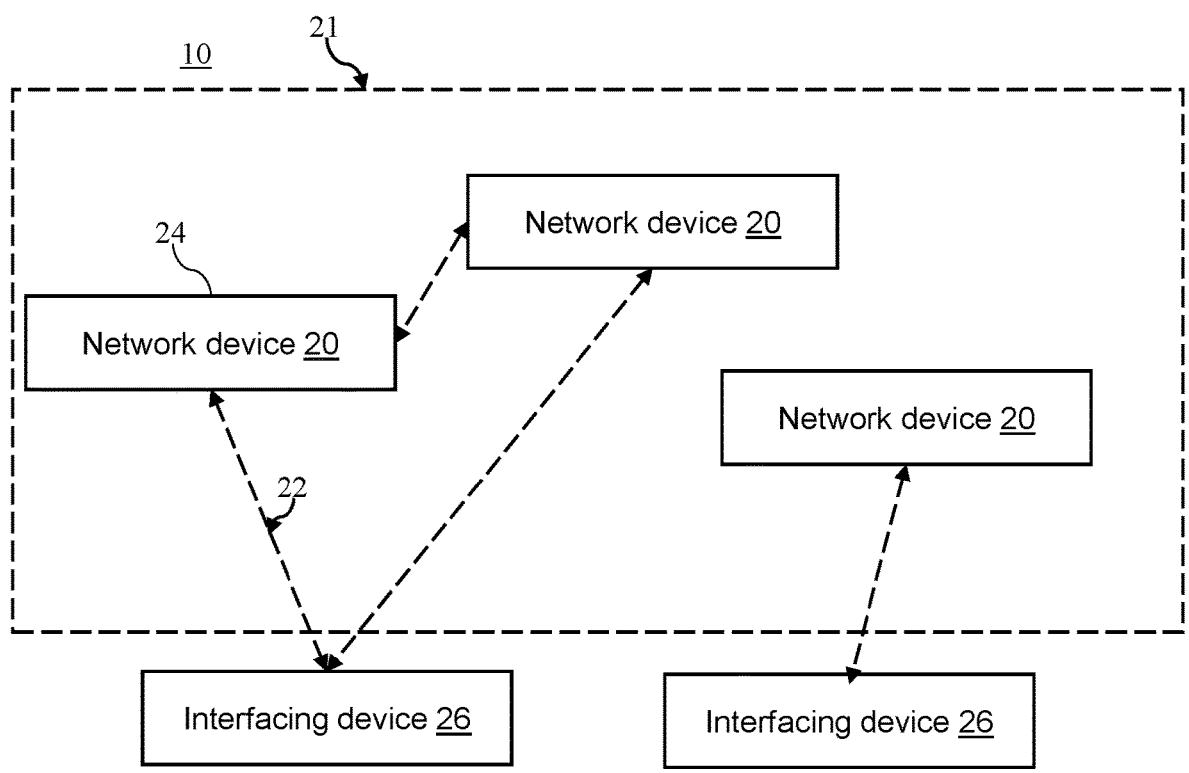
FIG. 2 is an exemplary diagram of network communication between network devices.

Turning to FIGS. 1 and 2, the computer device 10 includes memory 12 for storing the classification model 14 and processor circuitry 16 for executing the described functionalities. In operation, the computer device 10 receives network activity 18 (also referred to as network activity data) for multiple network devices 20 within a network 21. The network activity data 18 includes records 22 that represent the interactions between a communicating network device 24 and an interfacing device 26. Each record within the network activity data 18 includes parameters 28 related to the interaction (also referred to as network activity), including at least one of MAC address(es) of the communicating network device 24 and/or interfacing device 26, IP address(es) of the communicating network device 24 and/or interfacing device 26, network protocol(s), port numbers (e.g., destination and/or source), domain name(s), first-level domain name(s) (FLDs), hostname(s), DNS registrant(s), fully qualified domain name(s) (FQDNs), HTTP headers, timestamps, and data transfer amounts.

Figure 3:
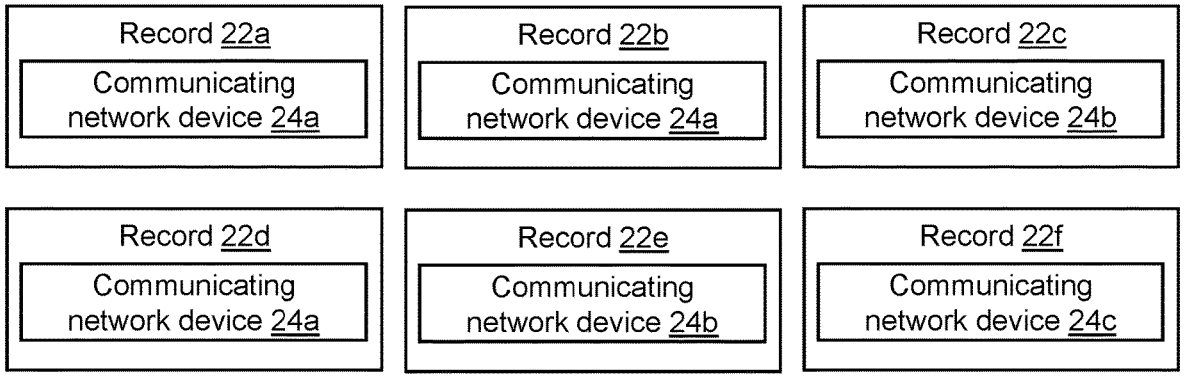
FIG. 3 is an exemplary diagram of multiple records representing network activity data.
Figure 4:
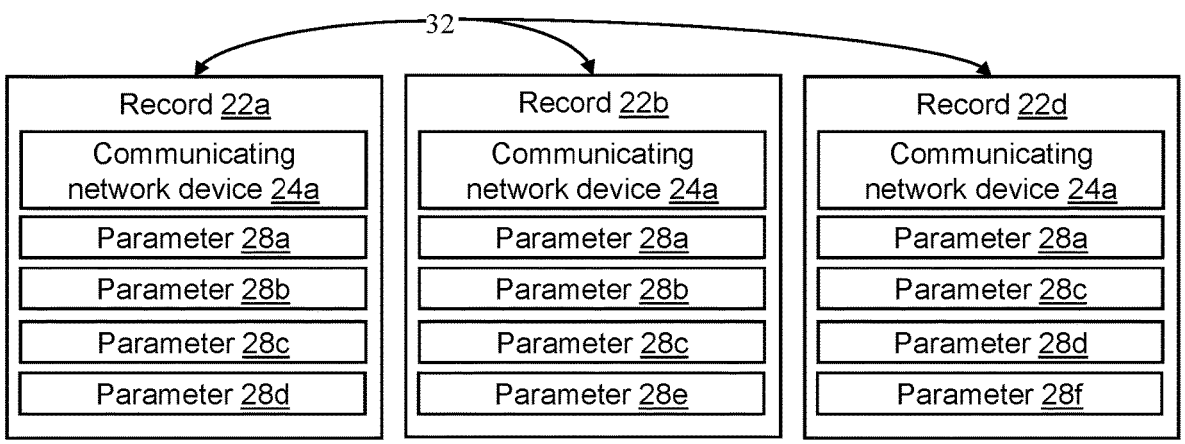
FIG. 4 is an exemplary diagram of correlation of the records of FIG. 3.
Figure 5:
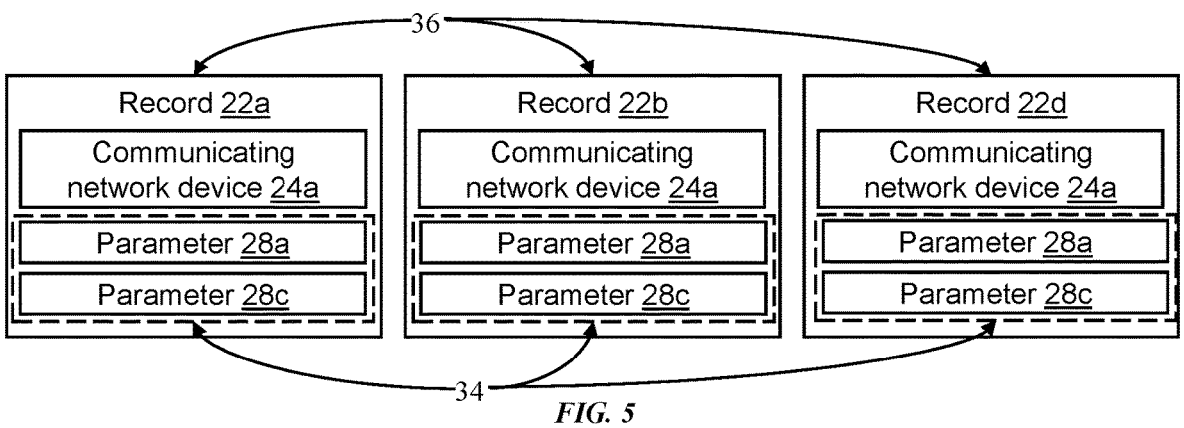
FIG. 5 is an exemplary diagram of normalization of the correlated records of FIG. 4.

With exemplary reference to FIGS. 3-5, to process the received network activity data 18, the processor circuitry 16 generates embedded vectors 30 based on the network activity. Generating the embedded vectors 30 includes correlating the individual records 22 within the network activity data 18, leveraging the communicating network device 24 as a basis for grouping. This correlation allows for the identification of multiple records 22 that are associated with the same device 24, resulting in the formation of correlated records 32. This correlation is represented in FIGS. 3 and 4, where the records 22 from FIG. 3 are grouped in FIG. 4 to show records 22 including the same communicating network device 24.

Following the correlation process, each correlated record 32 undergoes a normalization step, transforming it into a normalized record 36. This transformation is achieved by selecting a determined subset 34 of parameters 28. The subset 34 may be selected to represent characteristics of the device's network activity that have been found most successful in classifying the network devices. By focusing on this subset, the normalized record 36 retains the pertinent information while eliminating irrelevant or redundant data. This normalization is represented in FIGS. 4 and 5, where the parameters 28 from the records 22 in FIG. 4 are reduced to the selected subset 34 in FIG. 5.

The processor circuitry 16 computes a single embedded vector 30 for each correlated record 32, encapsulating the information for the network activity of the associated communicating network device 24. By generating these embedded vectors 30, the processor circuitry 16 facilitates efficient storage, retrieval, and classification of the network device based on the network activity data. That is, the embedded vectors 30 serve as representations of the device-level network activity, enabling classification of the network devices using the embedded vectors 30.

The generated embedded vectors 30 are used to create training data 44 for the classification model 14. This training data 44 is derived from a portion of the received network activity data 18 that includes labeled network activity 48 (also referred to as training network activity). That is, a portion of the network activity data 18 includes labels 50 identifying (also referred to as classifying) the communicating network device 24 associated with the network activity data 18. The embedded vectors generated from this labeled network activity 48, along with their corresponding labels 50 identifying at least one of the manufacturer 56 or function 58 of the communicating network device, collectively form the training data 44. For example, the label 50 may identify both the manufacturer 56 and the function 58.

The processor circuitry 16 utilizes this training data 44 to train the classification model 14. By leveraging machine learning techniques, the processor circuitry 16 optimizes the classification model 14 based on the embedded vectors and their corresponding labels. This training process enhances the model's ability to generalize and accurately classify network activity data beyond the labeled examples used for training.

The classification model 14 may be trained by sequentially training a decision tree using the generated training data 44. The decision tree may be trained to output a classification 54 that identifies at least one of the manufacturer 56 or function 58 based on the embedded vectors of the training data 44 and their associated labels. For example, the decision tree may output the manufacturer 56 and the function 58.

Once the classification model 14 is trained, the trained classification model 14 is applied to unclassified embedded vectors 60 (i.e., embedded vectors 30 generated based on network traffic data 18 for a unidentified network device not having a label). The trained classification model 14 processes these unclassified embedded vectors 60 and outputs a classification 54 that identifies at least one of the manufacturer 56 or function 58 for the respective unidentified network device. For example, the classification 54 may identify the manufacturer 56 and the function 58. The classification output may be transmitted to appropriate systems or entities for further analysis or decision-making processes.

The computer device 10 may further include the capability to apply a network security policy to the unidentified network device 20 based on the transmitted classification 54. For example, upon receiving the classification 54, the computer device 10 may access a network security policy database and retrieve a policy associated with the classification 54 (e.g., the retrieved policy may align with the manufacture, function, or manufacture and function of the classification 54). The network security policy may define a set of rules and restrictions specific to the identified manufacturer and/or function, allowing the computer device 10 to enforce appropriate security measures tailored to the device's 20 characteristics. For example, the applied security policy may limit internet sites accessible to the identified device. In one embodiment, the network security policy may issue an alert to an administrator if a device having a specific manufacturer and function are identified. For example, an administrator may be alerted if an HP printer is identified. By applying the network security policy, potential security risks associated with the unidentified network device can be mitigated, enhancing the overall security posture of the network infrastructure.

In one embodiment, the processor circuitry 16 is further configured to transmit the classification 54 as a vector of probabilities. The vector may include elements that identify different brands and functions, specifying the probability of the unidentified network device belonging to each identified brand and function category. The probabilities may be calculated based on the analysis of the received network traffic for the unidentified network device.

The network activity data 18 associated with each of the multiple network devices 20 may be divided into one or more flows. Each flow may represent a distinct sequence of network interactions and may be stored as a separate record 22 within the network activity data 18. By organizing the network activity data 18 into flows, the processor circuitry 16 may capture the chronological order and contextual information of network interactions for each device 20. This division into flows may enable more granular analysis and classification, as the characteristics and patterns specific to each flow may be considered during the generation of embedded vectors and the training of the classification model. By treating each flow as a separate record 22, the processor circuitry 16 may capture and utilize the temporal dynamics of network activity to improve the accuracy and effectiveness of the classification process.

The network activity may include the network protocol, such as TCP or UDP. The network activity may also include FQDN (e.g., found in DNS traffic and SSL/TLS (as defined in RFC5246, which is hereby incorporated by reference) including in X.509 certificates (exchanged during handshake) and TLS SNI (Server Name Indication) fields). The network activity may also include HTTP (as defined by RFC7231, which is hereby incorporated by reference) headers and their associated values (e.g., including the User-Agent header). The amount of data sent and/or received by the device may be specified in bytes. Fully Qualified Domain Names (FQDNs) are complete and unique domain names that specify the exact location of a specific computer or network in the tree hierarchy of the Domain Name System (DNS).

FQDNs are used to uniquely identify a specific computer or device on the Internet, and are essential for many network-related tasks, such as DNS resolution, email routing, and web browsing. An FQDN consists of the hostname, which is the name of the computer or device on the network, and the domain name, which is the hierarchical name structure that identifies the organization or entity that controls the domain. The domain name is composed of multiple levels, separated by dots, starting with the top-level domain (TLD), such as .com, .org, or .net. For example, the FQDN for the website of the popular search engine Google is "www.google.com". The hostname is "www", which stands for World Wide Web, and the domain name is "google.com", which identifies the organization that controls the domain.

In one embodiment, the parameters 28 comprising the network activity data 18 are extracted from various sources, including logs and direct reception from the network traffic of the device(s). These logs may originate from multiple entities involved in the network ecosystem, such as the device itself, other interacting devices, or intermediate network devices like routers, switches, proxies, firewalls, or network monitoring devices.

The device may generate its own logs, capturing pertinent information about its own network interactions. Additionally, logs from other devices that the device is interacting with may provide the corresponding parameters 28 associated with those interactions. Furthermore, intermediate network devices, such as routers, switches, proxies, firewalls, or network monitoring devices, may generate logs containing essential parameters 28. Moreover, certain parameters 28 may be directly extracted from the network activity itself, either by the device, other interacting devices, or intermediate network devices.

In addition to logs and direct extraction, the computer device or other active probing mechanisms may actively collect certain parameters 28 by employing protocols such as Universal Plug and Play (UPnP) and Bonjour. These protocols enable the computer device to actively query and probe other devices within the network ecosystem, obtaining relevant parameters 28 that enrich the network activity data.

The records 22 within the network activity data 18 may be augmented to include processed data. This processed data may be determined by applying various algorithms, techniques, or computations utilizing the parameters 28 of the network activity data 18. For example, a lookup may be performed of the DNS registrant associated with the first-level domain name (FLD) of a domain name. This lookup may be carried out using a database containing information about such registrants. For example, this lookup may be performed using the WHOIS protocol, which provides access to domain registration information.

Each record 22 may be correlated with the multiple network devices based on the IP address and/or the MAC address of the communicating network device associated with the record. This correlation process allows for the grouping of records that originate from the same network device, enabling the extraction of device-specific characteristics and patterns during the generation of embedded vectors. By correlating the network activity data 18 with the multiple network devices, the computer device can effectively train the classification model to accurately classify network devices based on their manufacturer and function, taking into account the distinct behaviors exhibited by different devices.

In one embodiment, the correlation of network devices based on their IP or MAC addresses takes into consideration the dynamic nature of these addresses. Due to the possibility of IP or MAC address changes, the correlation process may focus on records that are temporally close to each other, typically within a specified duration of time. For instance, records that have a time stamp within 24 hours (or any other preconfigured time period) of each other may be combined for correlation purposes.

To extend the correlation period, multiple records can be strung together. For example, if record one occurs 22 hours after record two and record two occurs 16 hours after record three, it is possible to combine records one, two, and three. By doing so, a longer time frame of 24 hours can be effectively utilized for correlation, incorporating records that may not be directly within 24 hours of each other individually. The source may be the communicating network device 24 or the interfacing device 26, with the destination being the other of the communicating network device 24 or the interfacing device 26.

The records 22 may represent interactions between a source and a destination. During normalization of the parameters 28, the selected subset of parameters 34 may include the destination port number, the first-level domain (FLD) name of the destination, the hostname of the destination, the DNS registrant of the destination, and time distribution of the network activity data. By including these parameters, the classification model 14 may capture information about the destination of network interactions. The selected subset of parameters has been found to provide insights into the communication patterns and characteristics of the devices involved in the network activity, contributing to the accuracy and discriminative power of the embedded vectors and the subsequent classification.

The normalization of the parameters 28 within each record 22 may involve removing (i.e., filtering out) records 22 that do not include each parameter 28 in the selected subset of parameters 34. This exclusion step may ensure that only records 22 containing all the selected parameters 34 are considered during the generation of embedded vectors 30. By removing records 22 lacking any parameter 28 from the selected subset 34, the processor circuitry 16 may enhance the consistency and quality of the embedded vectors 30, as well as the subsequent classification results. This may help ensure that the analysis and classification processes are based on comprehensive and complete information, thereby improving the accuracy and reliability of the classification model.

The conversion of the selected subset of parameters 34 to numerical vectors may include specific strategies for different types of parameters 28. For parameters 28 that are numerical values, the numerical values themselves may be directly included in the numerical vector. Conversely, for parameters that consist of strings, a conversion process may be employed to transform the string into a numerical value. This may be achieved by assessing characteristics of the string using one hot coding to represent the string as binary vectors. This approach may be used to enable the classification model 14 to represent diverse types of parameters consistently within the numerical vectors, facilitating further analysis and processing in subsequent stages of the classification model. For example, a Boolean question may be whether the parameter exists (e.g., resulting in a "0" if the parameters does not exist or a "1" if the parameter does exist).

The computing of a single vector for each correlated record based on the converted numerical vector of the records of the correlated record may be performed using any suitable method. For example, the computation could be performed by computing the median or any average (geometric, algebraic, harmonic, etc.) over the set of correlated vectors. It could be advantageous to represent the FLD parameter using the well-known Bag of Words (BoW) technique. Thus, if a device communicates has 2 flows with www.acme.com, 5 flows with hello.acme.com and 3 flows with www.example.com, then these could be represented in a vector as [2+5, 3], i.e. [7, 3] where 2+5 represents the number of flows with the acme.com FLD and 3 represents the 3 flows with example.com.

Dimension reduction may be performed on the computed single vector for each of the correlated records during the embedding process. This dimension reduction technique may be used to reduce the complexity and dimensionality of the embedded vectors while retaining their essential information and discriminative power. By reducing the dimensionality, the efficiency and computational performance of the classification model 14 may be improved. Additionally, dimension reduction may assist in eliminating noise or redundant features, enhancing the overall accuracy and generalizability of the classification model.

Dimension reduction may be performed using any suitable technique. For example, Principal Component Analysis (PCA) may be used to perform dimension reduction. PCA is a statistical technique used to reduce the dimensionality of high-dimensional data by projecting it onto a lower-dimensional space.

In one embodiment, the classification model is a gradient machine learning library (e.g., XGBoost). During the training of the classification model, a training algorithm may train decision trees in a sequential fashion. Training machine learning models using decision trees in a sequential fashion may involve an iterative process of building decision trees one after another. For example, an initial decision tree may be trained using the entire training dataset. This decision tree may serve as the starting point for the sequential training process. The initial decision tree may then be used to make predictions on the training dataset by calculating residuals representing the differences between the predicted values and the true target values. These residuals may then be used to train subsequent decision trees in the sequence. That is, the training dataset for the next decision tree may be updated by replacing the target variable with the calculated residuals from the previous step. This modified dataset may then be used to train the next decision tree in the sequence. Repeating this process, each decision tree may be trained using the updated training dataset, where the target variable is replaced with the residuals obtained from the previous step. During training, these decision trees gradually capture the remaining patterns and relationships in the data that were not captured by the earlier trees. Once all the decision trees in the sequence have been trained, the final prediction may be obtained by aggregating the predictions of all the decision trees, typically using an averaging or voting mechanism.

In one embodiment, the classification model is a logistic regression model. In this embodiment, the generated training data may be divided into a training set and a test set. The training set may be used to train the logistic regression model, while the test set is used to evaluate its performance. For example, the generated training data may be split randomly, allocating a certain percentage (e.g., 70-80%) for training and the remaining portion for validation. The classification model may be initialized with random or zero values for the weights. During training, the logistic regression model may iteratively adjust the weights to minimize the difference between the prediction and the actual labels. This difference may be quantified using a cost function (also referred to as a loss function) such as binary cross-entropy loss. To minimize the cost function and update the weights, an optimization algorithm may be used (e.g., gradient descent) that iteratively computes the gradients of the cost function with respect to the weights and updates the weights to minimize the cost function.

The classification model may also use deep learning. For example, the classification model may use Convolutional Neural Networks (CNNs), Recurrent Neural Networks (RNNs), Long Short-Term Memory (LSTM), transformers, etc.

The classification model may include a manufacturer classification model 62 and a function classification model 64. During the training process, the manufacturer classification model 62 may be specifically trained to output a classification that identifies the manufacturer of a network device. Similarly, during the training process, the function classification model 64 may be trained to output a classification that identifies the function of a network device. The training of the classification model 14 may involve separate training procedures for each classification model 62, 64, enabling focused learning on the manufacturer and function attributes of network devices. By training the manufacturer 62 and function classification models 64 independently, the classification model 14 may more effectively capture and analyze the unique characteristics and patterns associated with each aspect of the device's classification. That is, the segregated approach may enhance the accuracy and precision of the classification process, enabling more reliable and detailed identification of the manufacturer and function of network devices.

Additionally, applying the trained classification model to an embedded vector may involve utilizing both the manufacturer classification model 62 and the function classification model 64. The embedded vector, generated from the unidentified network device's network traffic, may be processed by both models to determine the manufacturer and function of the device.

The processor circuitry 16 may have various implementations. For example, the processor circuitry 16 may include any suitable device, such as a processor (e.g., CPU, Graphics Processing Unit (GPU), Tensor Processing Unit (TPU), etc.), programmable circuit, integrated circuit, memory and I/O circuits, an application specific integrated circuit, microcontroller, complex programmable logic device, other programmable circuits, or the like. The processor circuitry 16 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 16. The processor circuitry 16 may be communicatively coupled to the computer readable medium and a network interface through a system bus, mother board, or using any other suitable structure known in the art.

The computer readable medium (memory) 12 may be, for example, one or more of a buffer, a flash memory, a hard drive, a removable media, a volatile memory, a non-volatile memory, a random access memory (RAM), or other suitable device. In a typical arrangement, the computer readable medium 12 may include a non-volatile memory for long term data storage and a volatile memory that functions as system memory for the processor circuitry 16. The computer readable medium 12 may exchange data with the processor circuitry over a data bus. Accompanying control lines and an address bus between the computer readable medium 12 and the processor circuitry also may be present. The computer readable medium 12 is considered a non-transitory computer readable medium.

The network devices 20 described herein may be any networked device capable of communication within a network infrastructure. Examples of such network devices 20 include but are not limited to printers, Internet of Things (IoT) devices, routers, switches, access points, servers, printers, automobiles, security systems, thermostats and any other devices equipped with network interfaces. The network device may be connected through wired or wireless connections. It should be noted that the method is designed to be compatible with various network protocols and standards, such as Ethernet, Wi-Fi, Bluetooth, Zigbee, or cellular networks, allowing for flexible deployment in diverse networking environments. Furthermore, the method can be implemented in a distributed network architecture, where multiple network devices collaborate to execute the steps of the method, enabling efficient data processing and information exchange across the network.

The computer device 10 may encompass a wide range of computing devices suitable for performing the disclosed functions and methods. This includes but is not limited to servers, desktop computers, network switches, routers, laptops, mobile devices, tablets, and any other computerized device capable of executing software instructions. The computer device 10 may include standard components such as a processor, memory, storage, input/output interfaces, and other necessary elements to execute the methods effectively.

Furthermore, the computer device 10 is not limited to a single device but may be embodied in a distributed computing environment. In such an environment, multiple interconnected devices may collaborate and work in unison to execute the computational steps of the methods and functions.

In one embodiment, Direct Acyclic Graphs (DAGs) are applied to the classification model to provide a visual representation of how the classification model makes predictions or decisions. For example, the DAGs may be used to help to identify the most important features and decision points in the model. That is, DAGs may be used to represent the decision-making process of the model as a directed graph, where the nodes represent features or decision points, and the edges represent the flow of information between them. Each edge in the graph may represent a decision that the model has made based on a particular feature or set of features. By visualizing the decision-making process of the model in this way, DAGs can help to identify potential biases, errors, or weaknesses in the model, and can help to build trust and understanding among stakeholders.

Figure 6:
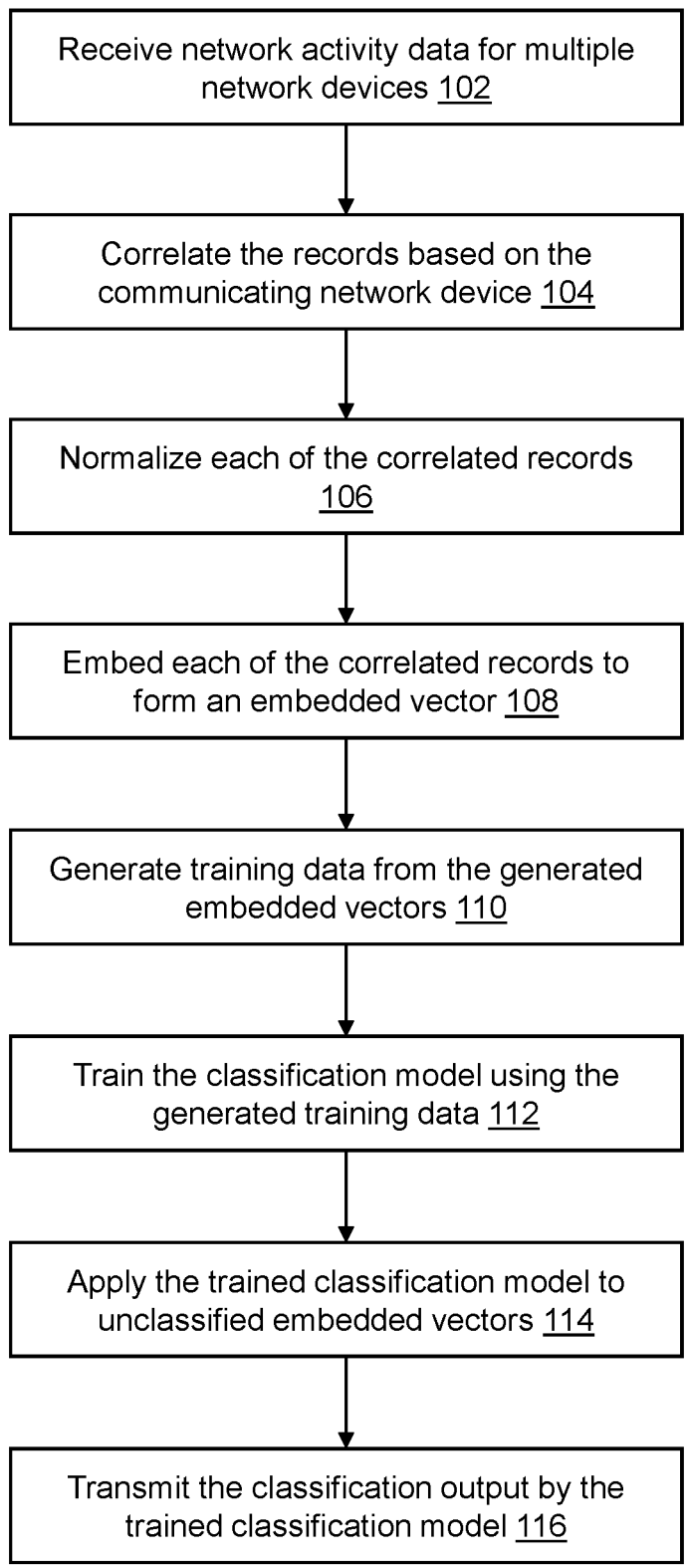
FIG. 6 is an exemplary flow diagram of a method for using processor circuitry to train and apply a classification model stored in a non-transitory computer readable medium to classify network devices.

Turning to FIG. 6, a method 100 is shown for training and applying a classification model stored in a non-transitory computer-readable medium to classify network devices based on their manufacturer and function using network activity data. The method 100 involves processor circuitry executing the described steps to facilitate the classification process.

In step 102, the method 100 receives network activity data for one or more network devices. As described above, the network activity data consists of records representing the interactions between a communicating network device and an interfacing device. Each record within the network activity data includes various parameters, such as MAC addresses, IP addresses, network protocols, source and destination port numbers, domain names, first-level domain (FLD) names, hostnames, DNS registrants, fully qualified domain names (FQDNs), HTTP headers, timestamps, and data transfer amounts.

To process the received network activity data, the method 100 proceeds by generating embedded vectors. This is achieved by correlating the records based on the communicating network device in step 104, grouping together multiple records associated with the same device. The correlated records are then normalized in step 106 by selecting a subset of parameters for each record within the correlated set. Subsequently, in step 108 the selected subset of parameters is converted into a numerical vector, and a single vector is computed as the embedded vector for each correlated record.

In step 110, the method 100 further involves generating training data from the generated embedded vectors. As described above, the training data consists of embedded vectors derived from a portion of the received network activity data that includes labeled training network activity data. Each embedded vector is associated with a label identifying the manufacturer and function of the communicating network device from which it was generated. This training data enables in step 112 the training of the classification model to output a classification identifying the manufacturer and function based on the embedded vectors. In one embodiment, a decision tree is sequentially trained using the generated training data to create the classification model, allowing for accurate classification of network devices.

Once the classification model is trained, in step 114 the trained classification model is applied to unclassified embedded vectors generated from network traffic data for an unidentified network device. The trained classification model processes the unclassified embedded vectors and produces a classification output that identifies the manufacturer and/or function for the respective unidentified network device. In step 116, the classification output is transmitted (e.g., to relevant systems or entities, providing valuable information about the unclassified device's characteristics).

The method 100 described herein may be performed using any suitable computerized device. For example, the method may be executed on a desktop computer, a laptop, a server, a mobile device, a tablet, or any other computing device capable of executing software instructions. The device may include a processor, memory, storage, input/output interfaces, and other standard components necessary for executing the method. The method 100 is designed to be platform-independent and can be implemented on various operating systems, such as Windows, macOS, Linux, or mobile operating systems like iOS and Android. Furthermore, the method may also be performed in a distributed computing environment, where multiple interconnected devices work collaboratively to execute the computational steps of the method.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer device for training and applying a classification model to classify network devices as having a manufacturer and function based on network activity of the network devices, the computer device comprising:
   memory comprising a non-transitory computer readable medium storing the classification model;
   processor circuitry configured to:
      receive network activity data for multiple network devices, wherein:
         the network activity data includes records with each record representing interaction between a communicating network device of the multiple network device and an interfacing device; and
         each record of the network activity data includes as parameters at least one of a MAC addresses of the communicating network device, a MAC address of the interfacing device, an IP addresses of the communicating network device, an IP address of the interfacing device, a network protocol, a source port number, a destination port number, a domain name, a first level domain (FLD) name, a hostname, a DNS registrant, a Fully Qualified Domain Name (FQDN), HTTP headers and their associated values, time of the network activity, amount of data sent by the communicating network device, amount of data received by the communicating network device, or temporal dynamics of the network activity;
      generate embedded vectors based on the received network activity data by:
         correlating the records of the received network activity data based on the communicating network device of each record, such that each correlated record includes one or more of the records of the received network activity data having a same communicating network device;
         normalizing each of the correlated records by, for each of the one or more records of the correlated records, selecting a subset of the parameters of the record;
         embedding each of the correlated records to form an embedded vector of the embedded vectors by:
            converting the selected subset of parameters of each of the one or more records of the correlated record to a numerical vector; and
            computing a single vector as the embedded vector for the correlated record based on the converted numerical vector of the one or more records of the correlated record;
      generate training data from the generated embedded vectors, wherein:
         a portion of the received network activity data comprises training network activity data having a label identifying at least one of a manufacturer or function for the communicating network device of the training network activity data;
         the training data includes one or more of the embedded vectors generated from the training network activity data and the label of the training network activity data the embedded vector was generated from;
      train the classification model to output a classification identifying at least one of a manufacturer or function based on the generated training data; and
      apply the trained classification model to unclassified embedded vectors generated based on network traffic for an unidentified network device; and
      transmit the classification output by the trained classification model identifying at least one of a manufacturer or function for the unidentified network device.

2. The computer device of claim 1, further comprising applying a network security policy to the unidentified network device based on the transmitted classification.

3. The computer device of claim 1, wherein the transmitted classification comprises a vector of probabilities, wherein each element of the vector identifies a brand and a function and specifies a probability of the unidentified network device having the identified brand and function based on the received network traffic of the unidentified network device.

4. The computer device of claim 1, wherein:
   for each of the multiple network devices, the network activity data of the network device is divided into one or more flows; and
   each of the one or more flows are stored as a separate record.

5. The computer device of claim 1, wherein:
   the records of the network activity data are augmented to include processed data; and
   the processed data is determined utilizing the parameters of the network activity data.

6. The computer device of claim 1, wherein each record of the received training data is correlated with the multiple network devices based on an IP address or a MAC address of the communicating network device of the record.

7. The computer device of claim 1, wherein each record represents interaction between a source and a destination and the subset of the parameters of each record selected during normalization of the parameters includes the destination port number, the FLD name of the destination, the hostname of the destination, the DNS registrant of the destination.

8. The computer device of claim 1, wherein the normalizing of the parameters of each record includes removing records not including each parameter in the selected subset of parameters.

9. The computer device of claim 1, wherein the converting of the selected subset of parameters to the numerical vector includes:
for parameters comprising a number, including the number in the vector; and
for parameters comprising a string, converting the string to a number by assessing characteristics of the string with one hot coding to represent the string as a binary vector.

10. The computer device of claim 1, wherein the embedding of each of the correlated records additionally includes performing dimension reduction of the computed single vector for each of the correlated records.

11. The computer device of claim 1, wherein:
the classification model includes a manufacturer classification model and a function classification model;
the training of the classification model includes training the manufacturer classification model to output a classification identifying a manufacturer and training the function classification model to output a classification identifying a function; and
applying the trained classification model to an embedded vector includes applying the manufacturer classification model to the embedded vector and applying the function classification model to the embedded vector.

12. A method for using processor circuitry to train and apply a classification model stored in a non-transitory computer readable medium to classify network devices as having a manufacturer and function based on network activity of the network devices, the method comprising:
receiving network activity data for multiple network devices, wherein:
the network activity data includes records with each record representing interaction between a communicating network device of the multiple network device and an interfacing device; and
each record of the network activity data includes as parameters at least one of a MAC addresses of the communicating network device, a MAC address of the interfacing device, an IP addresses of the communicating network device, an IP address of the interfacing device, a network protocol, a source port number, a destination port number, a domain name, a first level domain (FLD) name, a hostname, a DNS registrant, a Fully Qualified Domain Name (FQDN), HTTP headers and their associated values, time of the network activity, amount of data sent by the communicating network device, amount of data received by the communicating network device, or temporal dynamics of the network activity;
generating embedded vectors based on the received network activity data by:
correlating the records of the received network activity data based on the communicating network device of each record, such that each correlated record includes one or more of the records of the received network activity data having a same communicating network device;
normalizing each of the correlated records by, for each of the one or more records of the correlated records, selecting a subset of the parameters of the record;
embedding each of the correlated records to form an embedded vector of the embedded vectors by:
converting the selected subset of parameters of each of the one or more records of the correlated record to a numerical vector; and
computing a single vector as the embedded vector for the correlated record based on the converted numerical vector of the one or more records of the correlated record;
generating training data from the generated embedded vectors, wherein:
a portion of the received network activity data comprises training network activity data having a label identifying at least one of a manufacturer or function for the communicating network device of the training network activity data; and
the training data includes one or more of the embedded vectors generated from the training network activity data and the label of the training network activity data the embedded vector was generated from;
training the classification model to output a classification identifying at least one of a manufacturer or function based on the generated training data; and
applying the trained classification model to unclassified embedded vectors generated based on network traffic for an unidentified network device; and
transmitting the classification output by the trained classification model identifying at least one of a manufacturer or function for the unidentified network device.

13. The method of claim 12, further comprising applying a network security policy to the unidentified network device based on the transmitted classification.

14. The method of claim 12, wherein the transmitted classification comprises a vector of probabilities, wherein each element of the vector identifies a brand and a function and specifies a probability of the unidentified network device having the identified brand and function based on the received network traffic of the unidentified network device.

15. The method of claim 12, wherein each record of the received training data is correlated with the multiple network devices based on an IP address or a MAC address of the communicating network device of the record.

16. The method of claim 12, wherein each record represents interaction between a source and a destination and the subset of the parameters of each record selected during normalization of the parameters includes the destination port number, the FLD name of the destination, the hostname of the destination, the DNS registrant of the destination.

17. The method of claim 12, wherein the normalizing of the parameters of each record includes removing records not including each parameter in the selected subset of parameters.

18. The method of claim 12, wherein the converting of the selected subset of parameters to the numerical vector includes:
for parameters comprising a number, including the number in the vector; and
for parameters comprising a string, converting the string to a number by assessing characteristics of the string with one hot coding to represent the string as a binary vector.

19. The method of claim 12, wherein the embedding of each of the correlated records additionally includes performing dimension reduction of the computed single vector for each of the correlated records.

20. The method of claim 12, wherein:
the classification model includes a manufacturer classification model and a function classification model;

the training of the classification model includes training the manufacturer classification model to output a classification identifying a manufacturer and training the function classification model to output a classification identifying a function; and applying the trained classification model to an embedded vector includes applying the manufacturer classification model to the embedded vector and applying the function classification model to the embedded vector.

* * * * *